United States Patent
Rafii et al.

(10) Patent No.: US 7,741,961 B1
(45) Date of Patent: Jun. 22, 2010

(54) ENHANCED OBSTACLE DETECTION AND TRACKING FOR THREE-DIMENSIONAL IMAGING SYSTEMS USED IN MOTOR VEHICLES

(75) Inventors: Abbas Rafii, Palo Alto, CA (US); Colin Tracey, San Jose, CA (US); Stephen Charles Hsu, Sunnyvale, CA (US)

(73) Assignee: Canesta, Inc., Sunnyvale, CA (US)

( * ) Notice: Subject to any disclaimer, the term of this patent is extended or adjusted under 35 U.S.C. 154(b) by 237 days.

(21) Appl. No.: 11/906,046

(22) Filed: Sep. 28, 2007

Related U.S. Application Data (60) Provisional application No. 60/848,475, filed on Sep. 29, 2006.

(51) Int. Cl.
*B60Q 1/00* (2006.01)

(52) U.S. Cl. .............. 340/435; 340/436; 340/934; 340/937; 382/103; 348/148; 701/96

(58) Field of Classification Search ........... 340/435, 340/436, 923.2, 937, 934; 382/103, 224; 348/142, 148; 701/96, 209, 211
See application file for complete search history.

(56) References Cited

U.S. PATENT DOCUMENTS

| | | | |
|---|---|---|---|
| 6,963,657 B1 * | 11/2005 | Nishigaki et al. | 382/106 |
| 7,043,084 B2 * | 5/2006 | Beardsley | 382/224 |
| 7,298,247 B2 * | 11/2007 | Shimizu | 340/435 |
| 7,356,408 B2 * | 4/2008 | Tsuchiya et al. | 701/211 |
| 7,372,977 B2 * | 5/2008 | Fujimura et al. | 382/103 |
| 7,378,947 B2 * | 5/2008 | Daura Luna et al. | 340/435 |

* cited by examiner

*Primary Examiner*—Davetta W Goins
(74) *Attorney, Agent, or Firm*—Michael A. Kaufman, Esq; Canesta, Inc.

(57) ABSTRACT

An obstacle detection and tracking system identifies objects in the path of a vehicle equipped with the system and issues a visual, audible, and/or control system warning. The system includes a depth imaging system that acquires depth data from objects in the field of view of a detection zone encompassing at least a portion of the road to be driven upon. It is assumed most of the acquired data represents road plane information. Statistical analysis of the depth image data identifies in (X,Y,Z) space at least one plane of the road being driven, after which identification threshold normal heights above and below the road plane are defined. Imaged objects within the detection zone that are higher or lower than a threshold normal are deemed of potential concern and will generate a warning to the vehicle operator or vehicle.

20 Claims, 8 Drawing Sheets

ENHANCED OBSTACLE DETECTION AND TRACKING FOR THREE-DIMENSIONAL IMAGING SYSTEMS USED IN MOTOR VEHICLES

RELATIONSHIP TO CO-PENDING APPLICATION

Priority is claimed from co-pending U.S. provisional patent application Ser. No. 60/848,475 filed 29 Sep. 2006, entitled "Object Detection and Tracking using an Optical Time-of-Flight Range Camera Module for Vehicle Safety and Driver Assist Applications". This provisional application is assigned to Canesta, Inc. of Sunnyvale, Calif., assignee herein.

FIELD OF THE INVENTION

The invention relates generally to depth imaging systems usable in motor vehicles to alert the vehicle operator of obstacles that can endanger to the vehicle, or objects that may be endangered by the vehicle unless immediate corrective action is taken. The invention is useable with three-dimensional depth imaging systems, which systems may include stereographic cameras, and time-of-flight (TOF) depth imaging systems.

BACKGROUND OF THE INVENTION

Many modern motor vehicles include electronic sensing mechanisms that try to give the vehicle operator a sense of what is generally behind the vehicle as the vehicle is operated in reverse. For example, injuries may be caused by motor vehicles that are backing up, because the vehicle operator may not see objects in the vehicle path. The potential objects to be avoided, may not have been seen by the vehicle operator because they were in a blind-spot, perhaps obscured by a pillar in the vehicle, or perhaps obscured because they were too low to the operator's field of view. Often such objects are not seen simply because the motor vehicle operator is too preoccupied with reversing the vehicle to pay attention to what is behind the vehicle.

It has been suggested that different types of depth imaging can be used to detect objects around the car. Stereographic camera imaging systems often leave much to be desired in that there is an inherent ambiguity associated reconciling images acquired from two spaced-apart cameras. The depth measurement performance of stereographic cameras degrades rapidly as function of distance. Also, such cameras rely upon brightness information, and can be confused as to distance by bright objects that are farther away from the system than closer objects that reflect less light. Further, stereographic camera imaging systems do not function without ambient light, and thus are of little or no use in dark ambient conditions.

On the other hand, TOF systems can operate without reliance upon brightness data. Some TOF systems emit pulses of infrared optical energy and time how long it takes for emitted pulses to be detected as optical energy that reflects at least partially off a target object. Since the velocity (C) of light is known, the distance Z to a target object is given by Z=t■C/2, where t is the measured time-of-flight. U.S. Pat. No. 6,323, 942 (2001) entitled "CMOS-Compatible Three-Dimensional Image Sensor IC" and assigned to assignee herein Canesta, Inc., describes such a TOF system.

Other TOF systems emit optical energy of a known phase, and determine distances Z by examining phase-shift in the signal reflected from the target object. Exemplary such systems are described in U.S. Pat. No. 6,515,740 (2003) entitled "Methods for CMOS-Compatible Three-Dimensional Imaging Sensing Using Quantum Efficiency Modulation", or U.S. Pat. No. 6,906,793 (2005) entitled Methods and Devices for Charge Management for Three Dimensional Sensing. These, and other TOF patents, are assigned to assignee herein, Canesta. Inc.

Figure 1A:
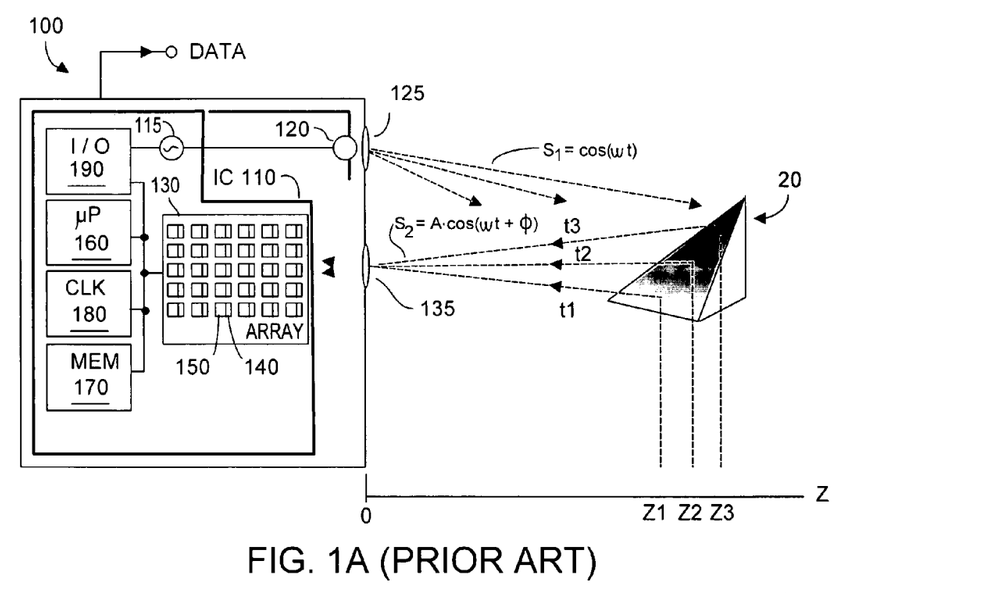
FIG. 1A depicts an exemplary phase-detecting time-of-flight system according to the prior art, with which the present invention may be practiced.

While the present invention operates with various types of depth imaging systems, TOF systems provide especially reliable data, and thus it will be useful to describe briefly a TOF system. FIG. 1A is taken from the '740 and '793 and depicts an exemplary phase-type TOF system. Such systems provide depth information (Z-distance between the sensor and a target object) at each pixel detector in a system detector sensor array for each frame of acquired data. As noted, relative phase shift between emitted optical energy and detected optical energy reflected by a target object is examined to determine Z-range to a target object.

In FIG. 1A, exemplary phase-shift TOF depth imaging system 100 may be fabricated on an IC 110 that includes a two-dimensional array 130 of pixel detectors 140, each of which has dedicated circuitry 150 for processing detection charge output by the associated detector. IC 110 preferably also includes a microprocessor or microcontroller unit 160, memory 170 (which preferably includes random access memory or RAM and read-only memory or ROM), a high speed distributable clock 180, and various computing and input/output (I/O) circuitry 190. Among other functions, controller unit 160 may perform distance to object and object velocity calculations.

Under control of microprocessor 160, optical energy source 120 is periodically energized by an exciter 115, and emits optical energy preferably toward an object target 20. Emitter 120 preferably is at least one LED or laser diode(s) emitting low power (e.g., perhaps 500 mW peak) periodic waveform, producing optical energy emissions of known frequency (perhaps a few dozen MHz) for a time period known as the shutter time (perhaps 10 ms). Typically emitter 120 operates at IR or near IR, with a wavelength of perhaps 800 nm.

Some of the emitted optical energy (denoted $S_1$) will be reflected (denoted $S_2$) off the surface of target object 20. This reflected optical energy $S_2$ will pass through an aperture field stop and lens, collectively 125, and will fall upon two-dimensional array 130 of pixel or photodetectors 140. When reflected optical energy $S_2$ impinges upon photodetectors 140 in array 130, photons within the photodetectors are released, and converted into tiny amounts of detection current. The detection current is typically integrated to accumulate a meaningful detection signal, used to form a depth image.

Thus, responsive to detected reflected optical energy $S_2$ transmitted (as $S_1$) by emitter 120, a three-dimensional image of the visible portion of target object 20 is acquired, from which intensity (A) and Z data can be obtained (DATA). More specifically, reflected incoming optical energy $S_2$ detected by each imaging pixel detector 140 includes intensity information (A), and phase shift information ($\phi$), where phase shift $\phi$ varies with distance Z and can be processed to yield Z data. The time-of-flight (TOF) required for optical energy transmitted by emitter 120 to reach target object 20 and be reflected back and detected by pixel detectors 60 is denoted as t. TOF information is captured from which distances Z are determined from the relationship Z1=t■C/2, where Z is distance to be measured, t is roundtrip TOF time, and C is velocity of light.

Figure 1B:
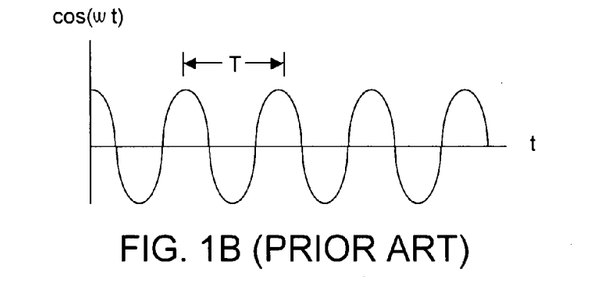
FIGS. 1B and 1C depict phase shifting for the exemplary time-of-flight system depicted in FIG. 1A, according to the prior art.
Figure 1C:
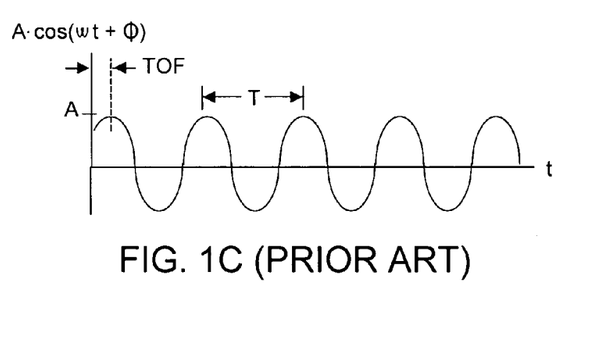

TOF sensor system 100 can acquire three-dimensional images of a target object in real time, simultaneously acquiring both luminosity data (e.g., signal amplitude A) and true TOF distance measurements of a target object or scene. FIGS. 1B and 1C depict how a measure of TOF can be determined from shift in phase ($\phi$) between the emitted optical energy (FIG. 1B) and the detected reflected optical energy (FIG. 1C). The DATA obtained from TOF system 100 may be processed to provide video and/or acoustic signals, and/or control system signals. For example, if system 100 were deployed within a motor vehicle and used to detect objects closer than a minimum distance Z, detection of such objects could generate a "Danger" audible command, a "Danger Icon" on a display, and/or a signal that will cause the vehicle to brake or steer in another direction.

Optical energy detected by the two-dimensional imaging sensor array 130 will include amplitude or intensity information, denoted as "A", as well as phase shift information, denoted as $\phi$. Responsive to pulses or bursts of optical energy transmitted by emitter 120, a three-dimensional image of the visible portion of target object 20 is acquired, from which intensity and Z data is obtained (DATA'). Information within DATA' may be used to generate an optical display representing target object(s) and their respective distances Z.

Figure 2A:
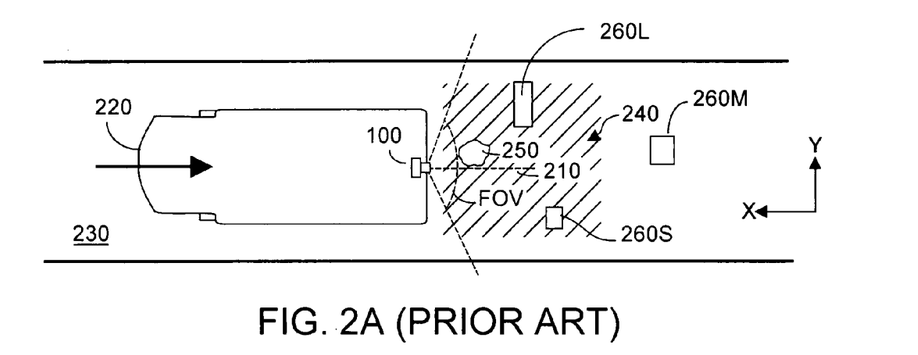
FIGS. 2A and 2B are plan and side views of an obstacle detection and tracking system, according to the prior art.
Figure 2B:
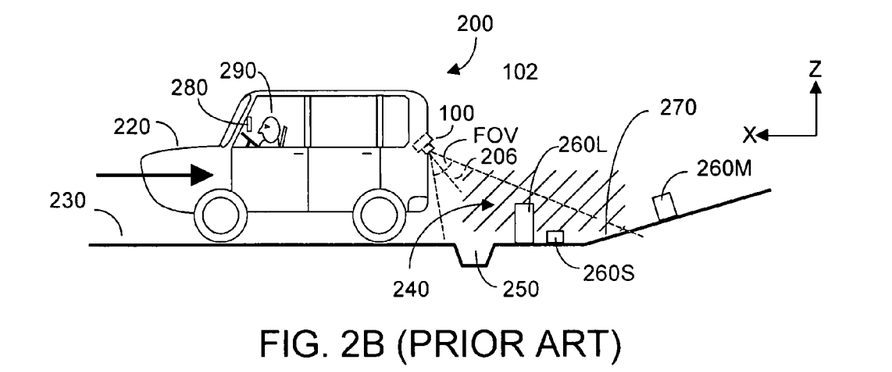

FIGS. 2A and 2B depict a prior art object detection and tracking system 200, which includes a prior art depth imaging system 100, which is understood to be a TOF system, a dual stereographic camera system, etc. System 100 is deployed so as to depth image a three-dimensional field of view (FOV) about the imaging system's optical axis 210 generally towards the rear of a motor vehicle 220 moving in reverse along surface 230, as indicated by the heavy arrowed line. In general, the FOV will encompass a desired detection zone, shown as cross-hatched rectangle 240. Detection zone 240 will typically be somewhat wider than the width of vehicle 220, and will extend rearward perhaps 9' (3 M). As such, a detection zone is defined within which it is desired to recognize objects representing potential objects to vehicle 220, or to recognize objects that could be harmed by vehicle 220.

As indicated in FIGS. 2A and 2B, within detection zone 240 and FOV are a number of real objects, and one phantom object. More specifically, pothole (or the like) 250, tall target object 260-L, and a small target object 260-S. Within the detection zone is what may be reported as a fictitious or phantom object, the inclined region 270 of the roadway itself. Just beyond the detection zone is a medium target object 260-M.

In practice, prior art systems 200 will generally not "see" and thus miss identifying pothole 250 as an object of potential concern. Simply stated, the location along the z-axis of the x-y plane of road 230 is simply not readily known to system 200, and thus identification of the pothole as an object below the plane of the road is not made. The large target object 260L will typically be correctly identified as a potential object but the small target object 260S may often simply not be detected. However object 260S should be detected so a decision can be made whether it may be ignored. Inclined region 270 of roadway 230 is within the detection zone and may be sufficiently high to register as an object of potential concern, even though such identification is spurious, a false-positive. Nonetheless imaging system 100 may actually image or see this inclined surface of the road as a large object of potential concern to vehicle 220. Regretfully false-positives can be dangerous in that they may lull the vehicle operator into simply disregarding all warnings from system 200.

Figure 2C:
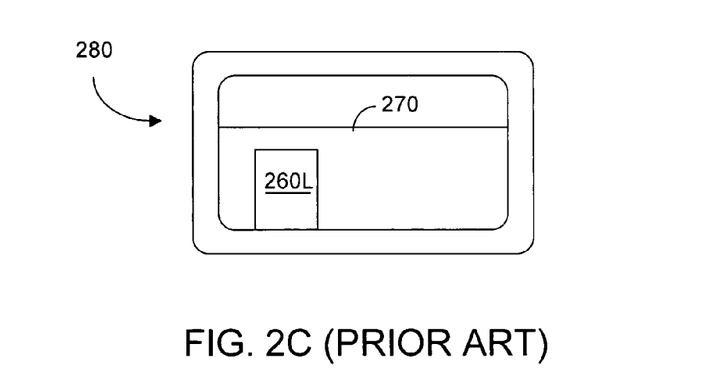
FIG. 2C depicts a display portraying objects identified by the obstacle detection and tracking system of FIGS. 2A and 2B, according to the prior art.

As shown in FIGS. 2B and 2C, within vehicle 220 will be a display 280 or other warning indicator that can advise operator 290 as to the presence of objects of potential concern within the detection zone behind the vehicle. Thus, typically while operating vehicle 220 in reverse, operator 290 could simply look forward at display 280. If system 200 somehow could function perfectly, it would always correctly recognize objects such as 250, 260-L, 260-S, and would reject phantom objects such as inclined road surface 270. If vehicle 220 moved further rearward, object 260M would come into detection zone 240 and would hopefully then be correctly identified as an object of potential concern.

But in practice, as suggested by FIG. 2C, display 280 will correctly depict object 260L, which depiction may be generic rather than an actual image of the object, but will fail to display pothole 250, and small object 260S. Furthermore, display 280 will generally depict as the largest object the inclined roadway portion 270, which indeed to imaging system 100 may look like a large object, but is not. Thus, in addition to not displaying real objects 250 and 260S, prior art system 200 will generate a false-positive and will indicate inclined roadway region 270 as a large object. Upon seeing portrayals of objects of concern on display 280, operator 280 typically will halt vehicle 220 and look rearward or look in the rearview mirror to see what is actually present behind vehicle 220.

Thus, there is a need for an obstacle detection and tracking system useable with depth imaging systems that can identify objects of potential concern, while rejecting false-positive identifications. The class of identifiable objects of potential concern should preferably include potholes and the like, below the average plane of the roadway, as well as small objects that frequently are missed by prior art systems.

The present invention provides such systems and methods for their implementation.

SUMMARY OF THE PRESENT INVENTION

In a first aspect, embodiments of the present invention provides an obstacle detection and tracking system that uses a depth imaging system to acquire at least depth data. The depth imaging system is mounted in a fixed location relative to a rear portion of the vehicle, and has a three-dimensional field of view (FOV) encompassing at least a portion of a detection zone in which objects including objects below the road surface such as potholes are to be identified. The depth data is processed to provide a statistical model used to detect and identify objects of potential concern on a road, especially behind a backing-up vehicle equipped with the present invention.

The depth images are acquired in a first coordinate system local to the depth imaging system, which coordinates preferably are converted to world coordinates relative to the road plane. Preferably using world coordinates, the depth images are analyzed statistically to identify in three-dimensional (X,Y,Z) space at least one plane of the road being driven upon by the vehicle containing the present invention. Preferably the entire acquired image is sampled, with the assumption that most of the image data comprises road plane information. Once the road plane is identified, threshold normal heights above and below the road plane are defined. Objects within the detection zone that are higher or lower than threshold normals are of potential concern, but if the objects are lower than the threshold, they should be ignored to reduce false-positive alarms.

Once obstacles have been identified as being potentially of potential concern, e.g., they are within the detection zone and satisfy size requirements, their detected presence will result in a visual, and/or audible, and/or command signal being generated. Detected such obstacles may be displayed symbolically or with actual images on a display viewed by the vehicle operator while backing-up the vehicle. The present invention, upon detecting an object of potential concern, can issue an audible command or signal, and/or a control signal that can affect operation of the vehicle, e.g., to brake the vehicle to halt its rearward motion towards such object.

Preferably the detection zone is dynamically adjustable as to size as a function of at least one of vehicle speed, road conditions, vehicle operator reaction time, and the like. A software routine stored in, or loadable into, memory upon execution by a processor preferably carries out the signal processing used to identify objects of potential concern. Embodiments of the present invention provide an obstacle detection and tracking system with substantially fewer false-positive responses to detected objects than prior art systems.

Other features and advantages of the invention will appear from the following description in which the preferred embodiments have been set forth in detail, in conjunction with their accompanying drawings.

DETAILED DESCRIPTION OF THE PREFERRED EMBODIMENT

Figure 3:
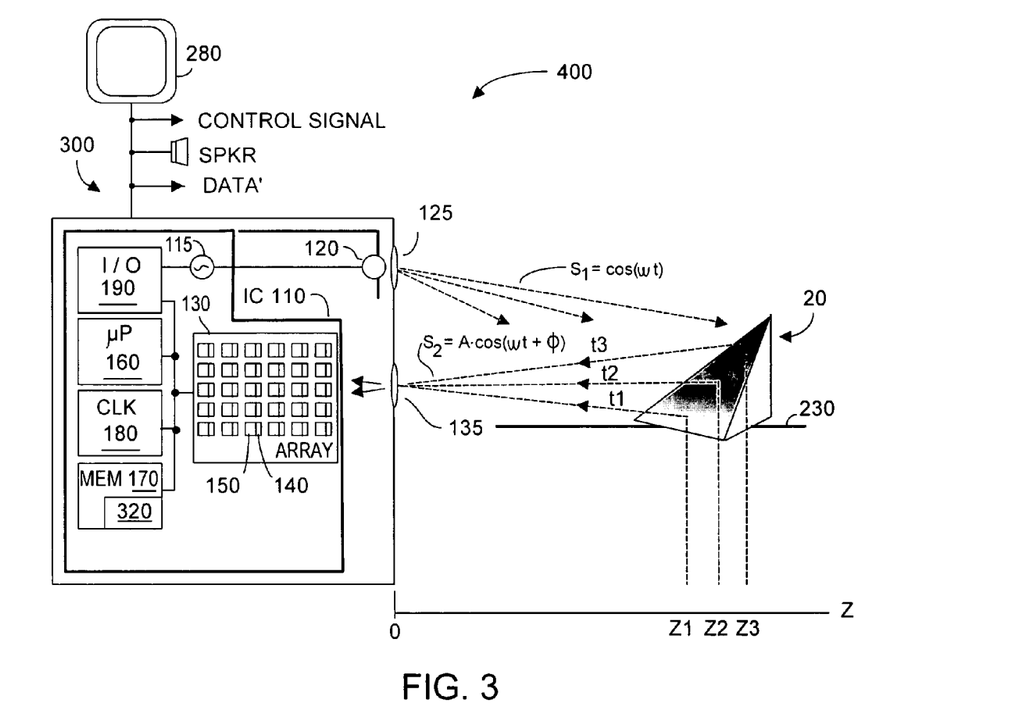
FIG. 3 depicts an obstacle detection and tracking systems, according to embodiments of the present invention.

FIG. 3 depicts enhanced obstacle detection and tracking system 400, according to an embodiment of the present invention, in which a TOF imaging system 300 similar to what described in FIG. 1A is employed to obtain depth images of the relevant field of view (FOV). However imaging system 300 includes in memory 170, or loadable or storable into memory 170, software 320, which when executed by a processor, perhaps processor 160, will implement algorithms that carry out the present invention.

Figure 4:
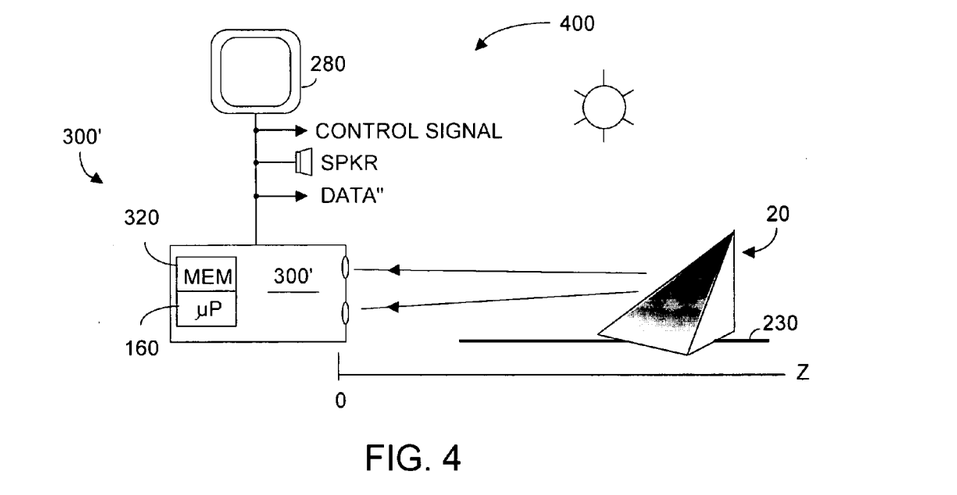
FIG. 4 depicts an obstacle detection and tracking systems, according to embodiments of the present invention.

FIG. 4 is a more generic depiction of an enhanced obstacle detection tracking system 400, according to the present invention, in which depth imaging system 300 or 300' may be a stereographic-type system or other depth imaging system. However system 300' is implemented, according to embodiments of the present invention it will include a memory region (MEM) which there is stored or is storable (e.g., loadable into) software 320 that when executed by a processor, e.g., 160, will implement algorithms carrying out the present invention. In some non-TOF prior art depth imaging systems, ambient light such as the sun (shown symbolically) may be required for imaging to occur.

Referring still to FIGS. 3 and 4, as described later herein, when system 300 or 300' identifies an object of potential concern, the identification is communicated to the operator of a moving vehicle associated with the system. This communication can be made visually on display 280, and/or can be enunciated audibly via a speaker (SPKR), e.g., "DANGER", "STOP", and/or can be used to generate a control signal. The control signal could be used to sound the vehicle horn and/or to apply the vehicle brakes.

Figure 5A:
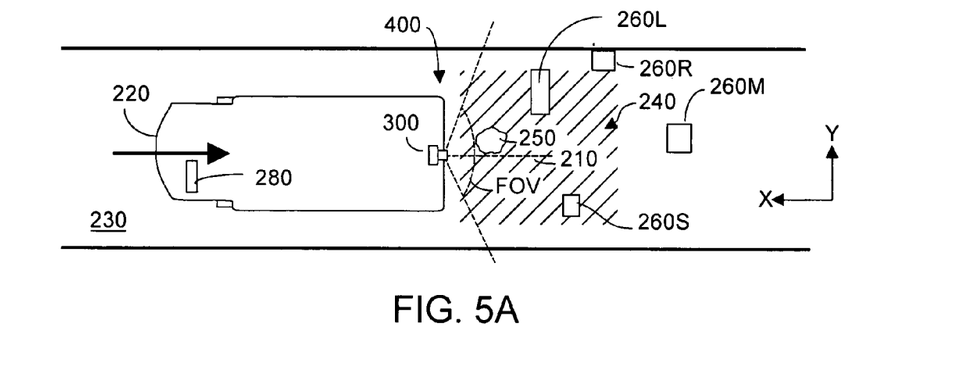
FIGS. 5A and 5B are plan and side views of an obstacle detection and tracking system, according to embodiments of the present invention.
Figure 5B:
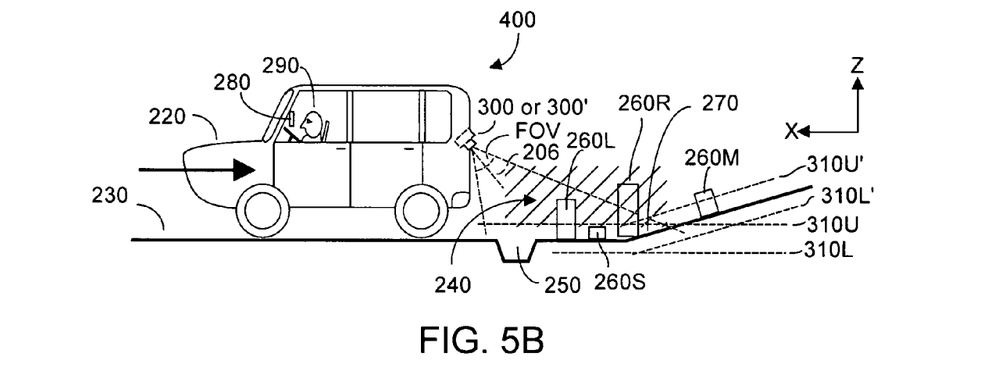
Figure 5C:
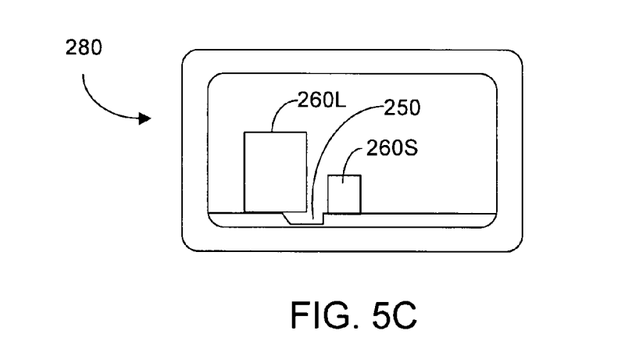
FIG. 5C depicts a display portraying objects identified by the obstacle detection and tracking system of FIGS. 5A and 5B, according to embodiments of the present invention.

FIGS. 5A and 5B depict an embodiment of the present invention, and FIG. 5C depicts a display generated by system 300, according to the present invention. System 300 may be built into vehicle 220, or may be added as an after-market device, perhaps attached above the rear license plate. It is seen in FIG. 5C that display 280 correctly represents objects 260L, 260S, and pothole 250 and, correctly, does not display phantom object 270. Thus, using system 300, operator 290 in FIG. 5B sees accurate information on display 280 as to what lies in detection zone 240 behind vehicle 220, and is spared false-positive warnings. Note that object 260R is intentionally not displayed because it is present outside warning zone 240. Thus, what the operator sees on display 280 are objects of potential concern, e.g., sufficiently sized objects whose detected (x,y,z) dimensions are sufficiently large to be of potential concern, and whose detected location is within the three-dimensional detection zone. The operator is not distracted with objects that need not presently be of concern, or with falsely reported objects.

In one aspect, processor execution of software routine 320 identifies the x-y plane of road 230 in three-dimensional x-y-z space. Upper and lower plane thresholds, shown respectively as phantom lines 310U, 310L, are software defined above and below the road plane. Objects taller than 310U, e.g., having a z-dimension greater than the height of 310U above the nominal road plane, will be defined as being of possible concern, and anomalies in the road plane lower than 310U, e.g., having a z-dimension lower than 310U, can be ignored to reduce generating a false-positive alarm. Thus, using these definitions and referring to FIG. 5B, pothole 250 is recognizable as an object of possible concern because it extends more deeply into the roadway than lower threshold level 310L. Within system 400, image range system 300 is fixed to vehicle 220 at a known position on the vehicle, and thus reference levels 310U, 310L, and detection zone 240 are relative to the moving vehicle. For this reason, when vehicle 220 moves sufficiently rearward to be on the inclined road region 270, the inclined region is not recognized as an object of potential concern because the upper and lower reference lines will now be parallel to the plane of incline, as shown by phantom lines 310U', 310L'.

In some embodiments, the relative position and dimensions of detection zone 240 are known to software 320 a priori. In other embodiments, relative position and dimensions of detection zone 240 are dynamically generated by software 320 as a function of existing conditions. For example, if vehicle 220 is moving rearward relatively slowly (as determined by data from the vehicle speedometer, or as determined by a TOF range image system) the dimensions of the detection zone can be smaller than if the vehicle were moving rearward more rapidly. Similarly if the surface of road 230 is wet or if the vehicle brakes are not good or if a person with slow reaction times is operating the vehicle, the size and relative position of the detection zone 240 may be expanded. In one embodiment of the present invention, road conditions, brake conditions, age or other condition of the operator may be manually input into system 300. In other embodiments, road condition and brake condition may be available from the vehicle's own computer, e.g., is the windshield wiper being used (rain), has excessive foot pressure by the operator on the vehicle brake been sensed, etc.

A description of detection and identification of objects such as pothole 250 will now be give. Understandably for executed software 320 to enable system 400 to determine whether an obstacle or cavity (e.g., pothole) is above or below certain thresholds (e.g., 310U, 310L in FIG. 5B) relative to the road 230 in detection zone 240, knowledge of the x-y plane of the road is needed. In reality roads are not perfectly planar, and in addition to bumps, potholes, and other irregularities, may have inclined regions, such as region 270 in FIG. 5B. Thus, as vehicle 220 moves rearward, the plane of the road may change, and system 300 (or 400) should recalculate location of the road plane, to reduce false-positive identification, and to avoid missing obstacles of potential concern. For ease of explanation, let it first be assumed that the road plane is known a priori to range image system 300 or 300'. This a priori knowledge is obtained using a calibration process as follows.

Referring to FIGS. 3, 4, 5A and 5B, range imaging system 300 or 300' will produce DATA having (x,y,z) data points with respect to the coordinate system of the range imaging sensors, e.g., within array 130 in FIG. 3, or associated with stenographic cameras in the embodiment of FIG. 4. But vehicle 220 is situated on the surface (or plane) of road 230, and determination of whether an object is of potential concern depends upon locating such objects in three-dimensional (x, y, z) space relative to the vehicle and road plane. Thus one aspect of the present invention provides two systems of coordinates. A first coordinate system is defined with respect to imaging range sensor in system 300 or 300'. A second coordinate system is defined with respect to the body of vehicle 220 and the plane of road 230, and will be referred to herein as having world coordinates. Thus, in a preferred embodiment, when system 300 or 300' detects an object, e.g., 260L, the coordinates of that object are mapped to world coordinates. A detection algorithm within software 320 then preferably operates on data using world coordinates, to determine whether the object is of potential concern and should be displayed, and/or audible enunciated, and/or used as a control signal to affect operation of the moving vehicle.

Figure 6A:
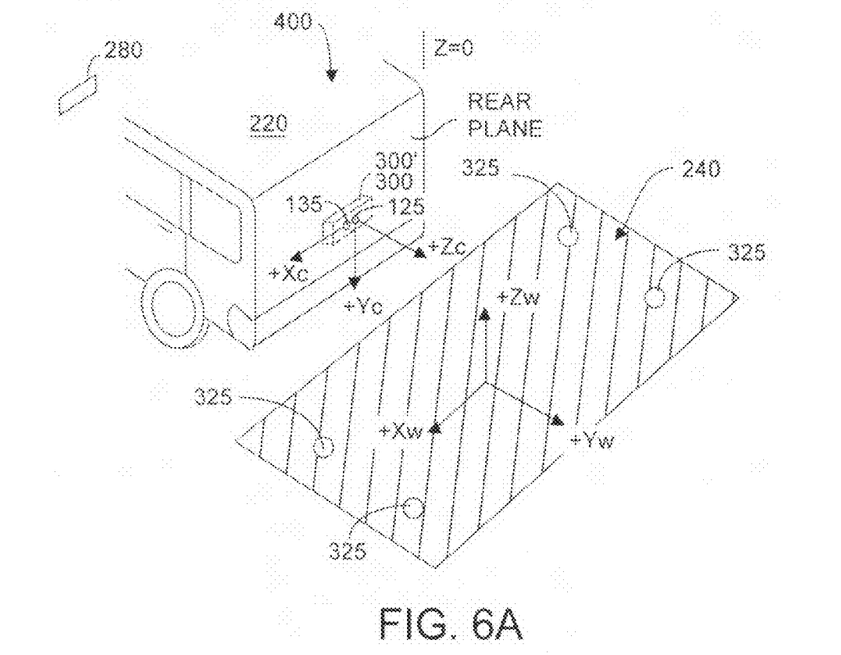
FIG. 6A depicts the relationship between coordinates relative to the rear plane of a motor vehicle carrying the present invention, and world coordinates, according to an embodiment of the present invention.

Referring to FIG. 6A, imaging depth sensor system 300 (or 300') is shown mounted internal to the rear plane of vehicle 220, with openings in the plane for lens 125 (through which emitted light passed from system 300), and for lens 135 (through while reflected light to be detected passes). Associated with depth sensing system 300 or 300' is coordinate system Xc, Yc and Zc. Thus, system 300 or 300' yields data containing (Xc, Yc, Zc) coordinate locations for imaged objects within the FOV, e.g., coordinates relative to system 300 or 300'. Detection zone 240 is depicted as a plane.

Having defined (Xc, Yc, Zc) coordinates, a set of world coordinates (Xw, Yw, Zw) is also defined. Preferably, the Zw=0 plane of the world coordinates coincides with the plane of the roadway or ground. As shown in FIG. 6A, preferably white colored calibration marks 325 are placed at known locations within detection zone 240, four such marks being depicted in FIG. 6A. Since the world coordinates have a physical definition with respect to the vehicle rear plane (REAR PLANE), this rear plane is readily defined using world coordinates. For instance, world coordinates can be defined such that the REAR PLANE is measured at, say, Yw =-10 cm in world coordinates. As seen by lens 135 associated with range imaging system 300, known calibration marks 325 in world coordinates will appear as white regions in an acquired brightness image acquired by system 300; see FIG. 6B. Such brightness image does not carry any depth information and is simply a gray scale image captured by system 300. FIG. 6C depicts an example of a true three-dimensional depth image of the same view acquired by system 300.

Detecting objects and identifying objects of potential concern imaged by sensing system 300 (or 300' preferably uses a projection matrix that maps (Xc, Yc, Zc) sense system coordinates to (Xwc, Yw, Zw) locations in world coordinates. What is needed is to compute Pcw such that:

$$\begin{bmatrix} Xw \\ Yw \\ Zw \end{bmatrix} = Pcw \begin{bmatrix} Xc \\ Yc \\ Zc \\ 1 \end{bmatrix} \text{ where}$$

$$Pcw = \begin{bmatrix} R_{11} & R_{12} & R_{13} & T_x \\ R_{21} & R_{22} & R_{23} & T_y \\ R_{31} & R_{32} & R_{33} & T_z \end{bmatrix} \text{ is a projection matrix,}$$

here comprising a 3×3 rotation and a 3×1 translation.

Figure 6B:
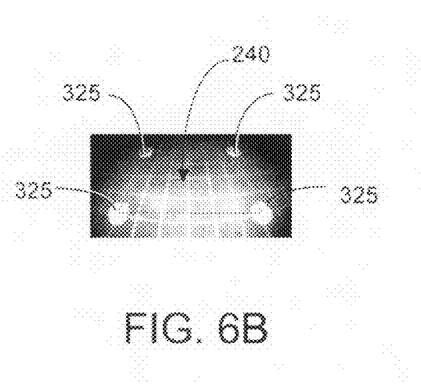
FIGS. 6B and 6C depict, respectively, gray scale and true three-dimensional images acquired by a depth sensing system used with the present invention.
Figure 6C:
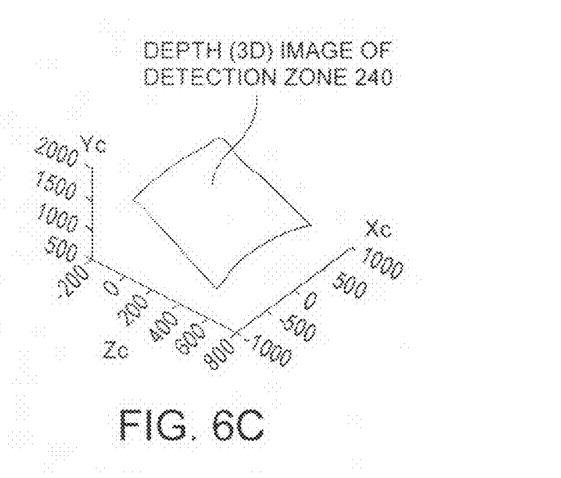

Referring to FIGS. 6A-6C, projection matrix Pcw can be determined by viewing an image of the known calibration marks 325 produced by range imaging system 300 or 300' when that system is mounted on vehicle 220. The center of the acquired image of each calibration mark 325 is then marked, and the center pixel 140 (see FIG. 3, sensor array 130). The pixel location and the depth value read at each center pixel defines (Xc, Yc, Zc) coordinates for calibration marks 325. Since corresponding (Xw, Yw, Zw, where Zw=0) world coordinates of the calibration marks are measurable, a mapping can be created from system 300 coordinates to the world coordinates used to calculate Pcw.

Figure 7:
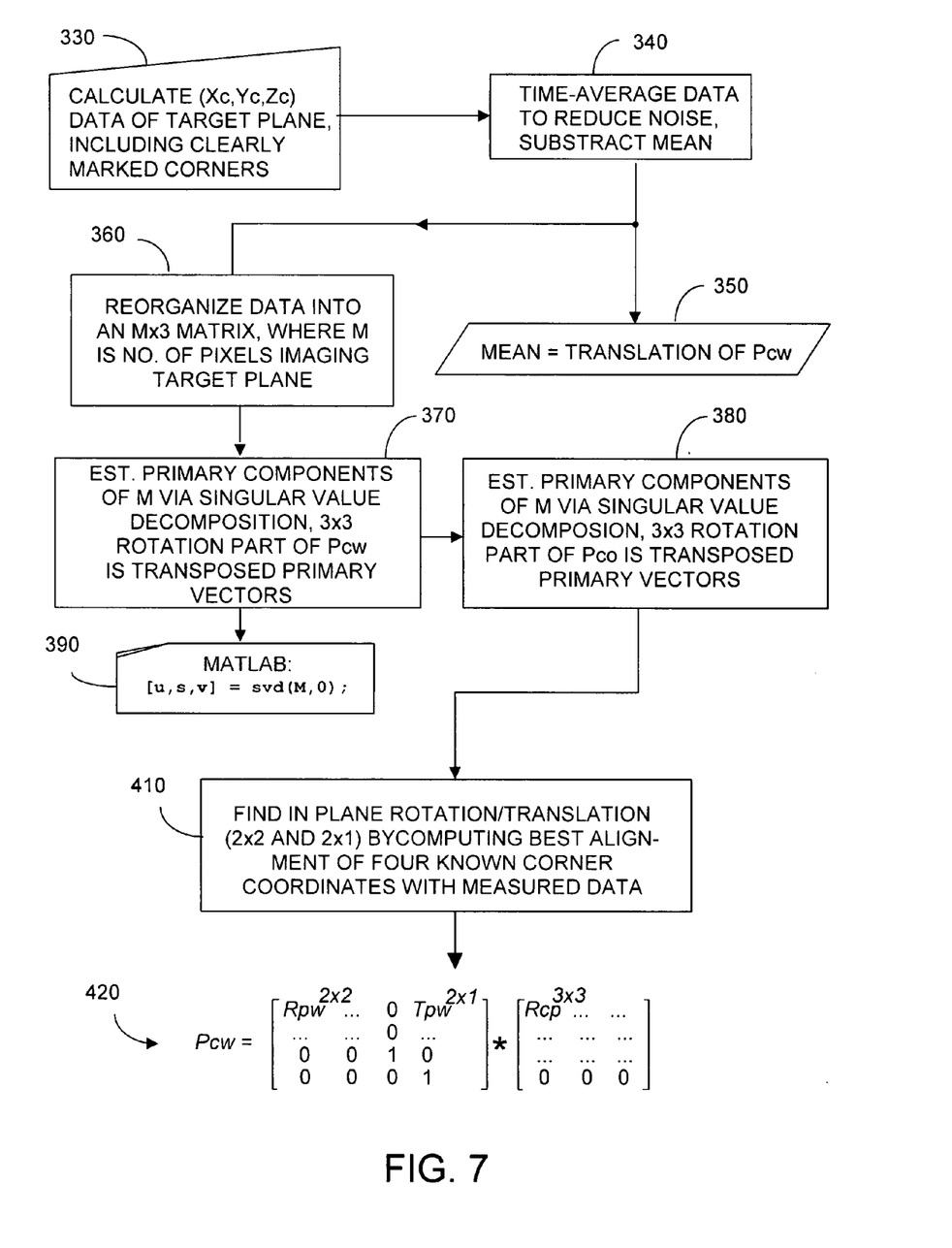
FIG. 7 depicts an exemplary flowchart for converting imaging range sensor system coordinates to world coordinates, according to embodiments of the present invention.

FIG. 7 depicts an exemplary flow chart showing such coordinate mapping, according to an embodiment of the present invention. Preferably the steps shown in FIG. 7 are carried out by execution of at least a part of software In FIG. 7, at method step 330, the target or detection plane 240 is provided with clearly marked calibration marks such as 325 near the plane corners. (Xc,Yc, Zc) data is acquired from the target or detection plane 240 by system 300 (or 300'). At method step 340, the acquired data is preferably time averaged to reduce noise effects. The mean values of the data are subtracted out. As noted at step 350, mean denotes the translation component that shifts the system 300 coordinate system origin to the center of the detection plane.

At method step 360, the thus-processed data is reorganized into a preferably M×3 matrix, where M represents the number of pixels 140 in pixel array 130 (see FIG. 3) image the target or detection plane 240.

At method step 370, an estimate of primary components of M is made, for example using singular value decomposition techniques. A 3×3 rotation is derived of the primary vectors, with care taken to orient the plane normal in the positive Zw direction, and to enforce a right handed coordinate system.

In one embodiment, step 370 is evaluated using the Matlab routine depicted in 390. At step 410, rotation and translation of the world coordinate origin within the detection plane is found in a preferably 2×2 rotation and 2×1 translation comprising a plane similarity transformation. This may be done by computing best alignment of the four known corner positions of the known calibration marks 325, with measured data as to calibration mark positions.

Finally as shown in step 420, the desired Pcw matrix is achieved.

As noted, one aspect of the present invention is the estimation of the plane of the road or ground. Knowledge of where the road plane is enables the present invention to reliably discriminate between objects above or below the road plane, and the road itself. This permits reliable operation of system 400, with minimal occurrences of false-positives.

In a preferred embodiment, system 400, executing at least a portion of software 320 estimates a model for the road plane or surface, and then analyzes deviations from that model to discern objects of potential concern.

Without loss of generality, fitting a planar surface to a road surface can be done statically as part of determining mapping between system 300 coordinates and world coordinates. One such calibration mapping method was described above with respect to FIG. 7, in which plane Zw=0 is essentially the planar model of the road surface. In this case, object height threshold 310U (FIG. 5A) is defined by an imaginary plane Zw=h where h is the height z of threshold 310U above the plane of road 230. Therefore, according to an embodiment of the present invention, system 400 will classify any object whose height Zw is exceeds h, e.g., is greater than height 310U above the road plane, and is within detection zone 240 (FIGS. 5A, 5B).

Advantageously, system 400 is more responsive to detection and identification of objects low to the ground such as object 260S (FIGS. 5A, 5B), even if the road slants or the vehicle attitude changes due to loading or road irregularities, without generating excessive false-positive alarms. By contrast, prior art conventional radar or ultrasound backing-up sensors cannot be tuned to detect low objects without constantly being triggered by signal returns from the ground itself. Thus, prior art systems tend to generate excessive false-positives when trying to discern such low lying objects.

It should be appreciated that the present invention takes into account changes in the otherwise static relationship between road plane and sensor system 300 plane. For instance, if vehicle 220 is heavily loaded, sensor system 300 will become closer to the ground, in which case the Zw=0 is only an approximation of the ground or road plane. Additionally, the road surface may slant as the car approaches a ramp, such as indicated by region 270 in FIG. 5B.

Figure 8A:
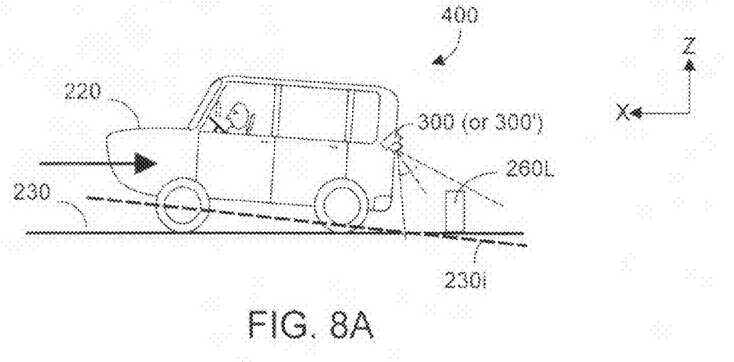
FIG. 8A depicts considerations associated with reorientation of an obstacle detection and tracking system due to vehicle loading, according to embodiments of the present invention.

Referring now to FIG. 8A, assume that the rear of vehicle 220 is depressed downward and slightly rotated with respect to the road. This orientation could result from heavy cargo or perhaps the weight of several passengers in the rear seats. With this orientation, the previously static road plane 230 will now become an imaginary plane 230i, shown in phantom line. Notwithstanding this change in orientation, depth imaging system 300 or 300' must still detect obstacles, e.g., obstacle 260L, with respect to actual road plane 230. Stated differently, the weight-induced orientation change to the rear of vehicle 230 (whereat system 300 or 300' is attached) dictates a dynamic re-estimation of the road plane. In one embodiment of the present invention, such re-estimation may be carried out by execution of software 320, e.g., by processor 160 or other processor.

Figure 8B:
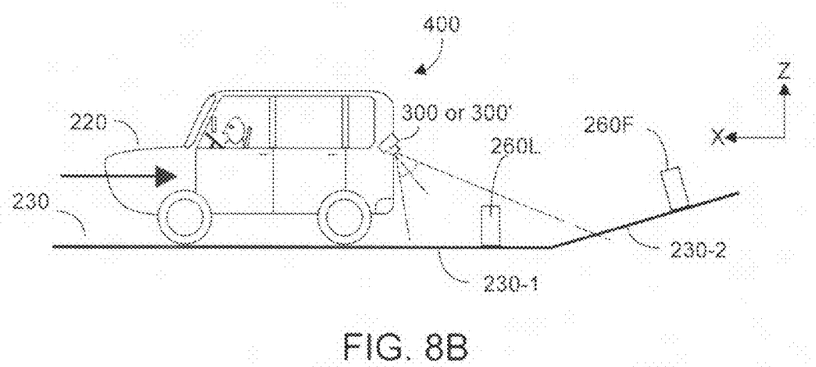
FIG. 8B depicts considerations associated with changes in the plane of a roadway over which a vehicle utilizing an obstacle detection and tracking system is moving, according to embodiments of the present invention.

FIG. 8B depicts considerations involved when vehicle 220 approaches an incline or ramp region of roadway 230. Under such conditions, the surface of road 230 may be defined as comprising at least two planes, denoted 230-1 (a nominally horizontal plane) and 230-2 (an inclined plane relative to plane 230-1). In FIG. 8B, obstacles closer to the rear of vehicle 230, e.g., obstacle 230L, should be detected with reference to plane 230-1, and more distant objects, e.g., obstacle 230F, should be detected with reference to plane 230-2. It will be appreciated that dynamical detection of changes in the road plane by obstacle detection and tracking system 400 will substantially reduce occurrence of false-positive object detection. Such dynamic detection of road planes preferably is carried out by executing software such as software 320 (see FIG. 3).

Applicants have found that a modified version of the prior art robust estimation method called RANSAC may be is applied to the collection of (Xc,Yc,Zc) data points obtained by image depth system 300 or 300'. The modified RANSAC method can find a road plane that fits most of the data. The found plane should generally be the road plane, providing the fraction of non-road data points is small. Reliability of plane identification is enhanced by restricting collection of estimation data points to the subset of points lying near the prior road plane estimate, and preferably within a region of interest mask. The prior estimate is based on the static measurement described earlier herein. In FIG. 8B, as system 300 (or 300') begins to image road plane 230-2, initially data points used for estimation will have been obtained from road plane 230-1 regions near the junction with road plane region 230-2. RANSAC is widely known in the art, and thus a detailed description herein is deemed unnecessary. Further details may be found, for example, in M. A. Fischler, R. C. Bolles, "Random Sample Consensus: A Paradigm for Model Fitting with Applications to Image Analysis and Automated Cartography," Communication. ACM, 24:381-395, June 1981.

Referring again to FIG. 8B, the road plane estimate near inclined region 230-2 preferably is enhanced with a so-called connected components algorithm that, like RANSAC, is well known in the art. Enhancement is desired in that criteria used by RANSAC do not always suffice for structured images where certain outier points are not randomly distributed. For example, the image of inclined region 230-2 represents a valid plane, and not outier points to be associated with horizontal plane region 230-1. Under such conditions, the number of inliers may be erroneously increased due to fitting a slightly tilted plane that can benefit from points belonging to both the horizontal and inclined plane surfaces, respectively 230-1, 230-2. If such approach were used, the result frequently is a rather spare distribution of inliers.

By contrast, the present invention recognizes the desirability of minimizing the probability of this happening. Thus, preferably at each RANSAC iteration, executed software 320 also subjects the inliers to a connected component algorithm, and retains only points that belong to the largest component. This model assumes that all points disconnected from other points are likely to belong to another plane, and does not allow such points to contribute to weighting the current plane. In a preferred embodiment, software 320 executes an algorithm that seeks multiple planes, provided sufficient points exist to support additional planes.

Figure 8C:
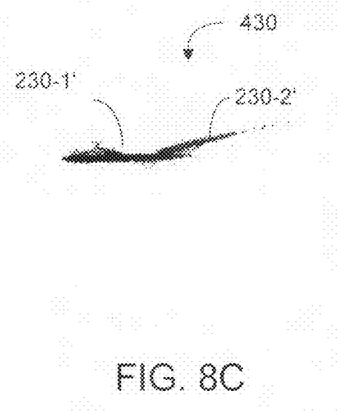
FIG. 8C is a side view depiction of a cloud of data acquired by depth imaging and processed according to identify differing road planes, according to embodiments of the present invention.

FIG. 8C depicts a side view of a cloud 430 of (Xc,Yc,Zc) data obtained by depth imaging system 300 (or 300'), according to embodiments of the present invention. As noted above, software 320 preferably applies RANSAC and a connected component algorithm upon data cloud 430, whereupon planes 230-1, 230-2 can be clearly recognized, as indicated respectively by 230-1', 230-2' in FIG. 8C. It will be appreciated in FIG. 8C that region 230-1' models the road plane closest to the rear of vehicle 220, plane 230-1, while data cloud region 230-2' models the more distant, or inclined ramp, plane 230-2. Preferably the present invention avoids breaking the same road surface into multiple patches or planes, and achieves this by merging planes that clearly model the same surface, e.g., planes having substantially the same normal and height.

Figure 8D:
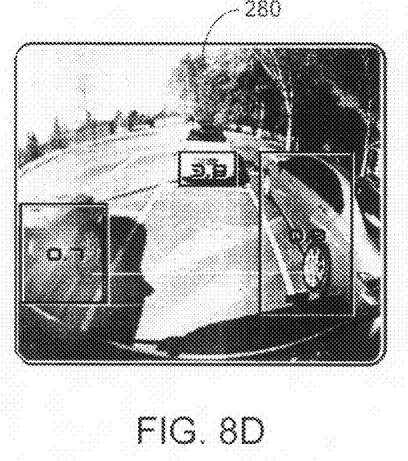
FIG. 8D depicts a grayscale capture of objects identified as being of potential concern, showing calculated range distance from rear of vehicle to objects, according to an embodiment of the present invention.

FIG. 8D depicts an actual image on display 280, showing a grayscale (or color, if desired) depiction of objects within the field of view identified as being of potential concern, as well as a range distance from each object to the rear of vehicle 220. Thus, the leftmost object is shown as being 0.7 M distant, the rightmost object is shown as being 0.9 M distance, and the furthest object is shown as being 3.9 M distant. As noted, the range of z distance values within which objects are deemed potentially of concern preferably is controllable by the present invention, dynamically or statically.

Consider now identification of above ground plane obstacles. As described above, in one aspect, processor execution of software 320 causes embodiments of the present invention to model the road plane. With knowledge of the road plane, an upper threshold, e.g., 310U (see FIG. 5B) can be defined. Objects having a height greater that the threshold, and also occurring within detection zone 240 may then be identified as being of potential concern.

More specifically, embodiments of the present invention estimate a local surface normal from the depth image acquired by system 300 (or 300'), and data points whose normal depart significantly different from vertical are detected. Such deviation from vertical detection improves system 400 sensitivity to small objects such as 260S (see FIG. 5B) whose height is so low relative to the road plane to potentially escape detection using solely height thresholding analysis.

As will be described further with respect to FIG. 9, in one aspect, execution of software 320 combines height and slope tests to produce a collection of (X,Y,Z) data points deemed to arise from surfaces other than the road itself, e.g., candidates as objects of potential concern. The (X,Y,Z) coordinates preferably are projected into a top-down view coordinate system (x,z) where z is the rearward distance along the ground from the back of the vehicle and x is the distance in the perpendicular direction ( ).

Preferably the data points are accumulated into a histogram in (x,z) space, and weighted by radial distance from sensors 140 in depth imaging system 300. Such weighting advantageously results in bin counts that are proportional to front-parallel surface area of the objects. Peaks in the road plane projection histogram preferably are found using a mean shift method to define distinct object hypotheses. Each such peak comprises the set of histogram bins that share the same local maxima in the histogram. All range image pixels 140 contributing to the same histogram peak are given an identical unique label, thereby segmenting the range image into non-overlapping object regions. Finally, above a threshold size are defined to be candidate objects of potential concern.

Figure 9:
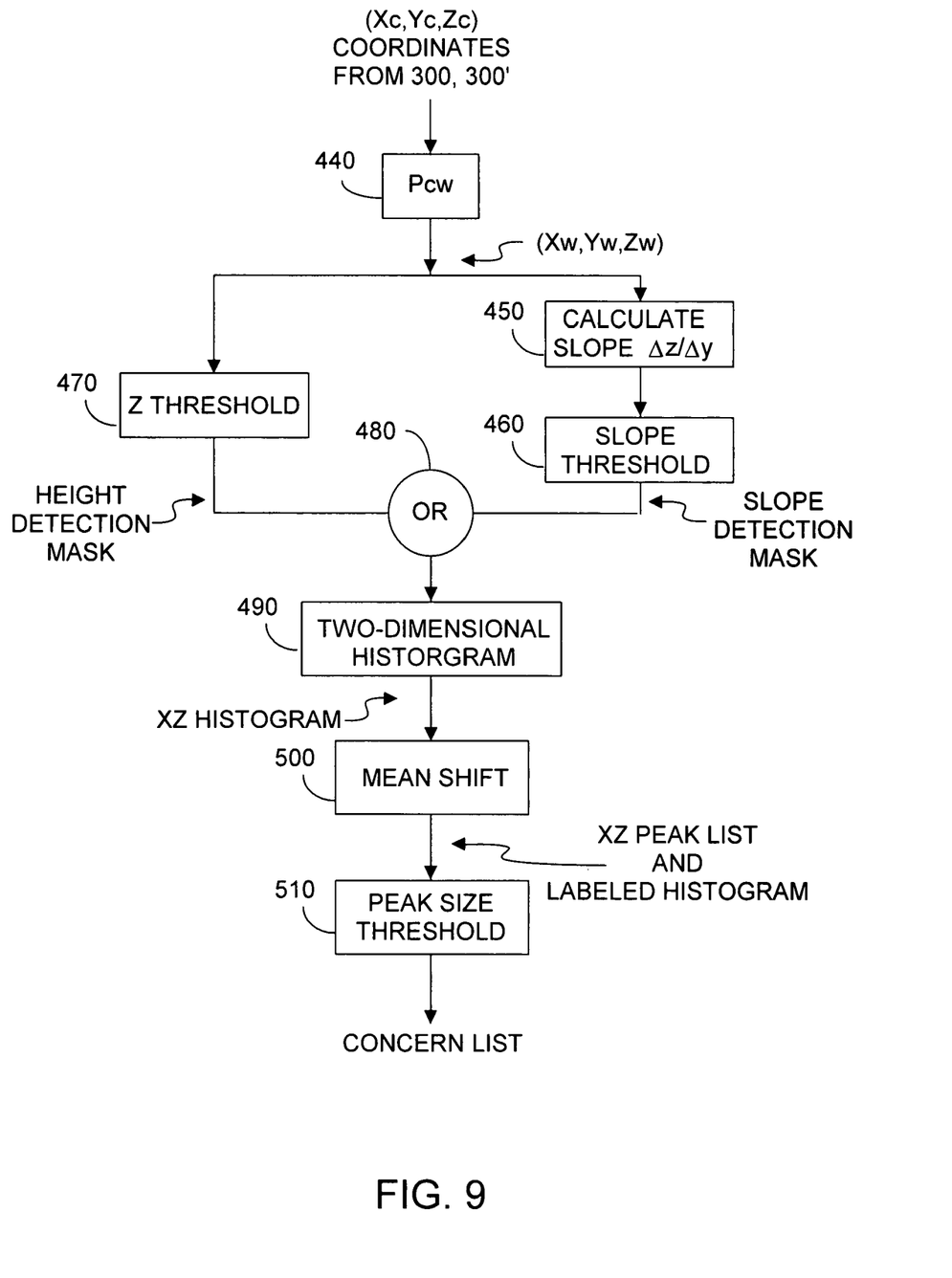
FIG. 9 is an exemplary flow chart depicting detection of off-road plane objects, according to embodiments of the present invention.

Turning now to FIG. 9, the method steps shown preferably are executed by routine 320. Once the plane of the road has been dynamically determined, preferably using a modified RANSAC routine, the transformation of (Xc,Yc,Zc) coordinates from system 300 to Pcw is updated at step 440 to yield current world coordinate data (Xw,Yw,Zw).

For application of thresholding 310U (or 310U') or 310L (310L'), the objects of potential concern should be first detected. Preferably two criteria are used to detect such objects. Acquired data points whose height z above the road plane exceeds a Z threshold are identified at step 470 to yield a height detection mask. Next, at step 450 a differentiation process is carried out to yield an estimated local surface slope $\Delta Z/\Delta Y$. Data points whose slope $\Delta Z/\Delta Y$ exceeds a slope threshold defined at step 460 are also identified, yielding a slope detection mask. This dual-masking approach improves sensitivity of system 400.

At step 480, a logical OR 158 combines the height and slope masks to define a collection of (X,Y,Z) data points deemed to arise from surfaces other than the road itself. At step 490, these data points are accumulated to form a two-dimensional XZ histogram. This histogram exists in (x,z) space and is weighted by radial distance from the detectors 140 in system 300 such that bin counts will be proportional to front-parallel surface areas of the objects. At step 500, a peak finding process locates peaks in the XZ road plane projection histogram, preferably using a mean shift method. Step 500 produces a list of distinct object hypotheses, in which each such peak is the set of histogram bins that share the same local maxima within the histogram. Preferably all range image pixels contributing to the same histogram peak are given an identical unique label, thereby segmenting the range image into non-overlapping object regions. Finally, at step 510, regions above a threshold size are candidate reported in a list of candidate objects of concern. Information in this list may be coupled to warning mechanisms such as display 280, a speaker, a control system for the vehicle, etc.

It will be appreciated from the foregoing that the present invention randomly samples substantially the entire depth image acquired by system 300 or 300', on the assumption that most of the imaged date represents the road plane in the field of view. A statistical model, rather than template matching, is used to detect objects and then objects that are of potential concern to the vehicle containing the present invention.

In many applications it is useful to track objects that move relative to vehicle 220. Thus, system 300 (300') may be positioned so as to image an outdoor scene comprising a juxtaposition of multiple above road plane objects, including objects that are stationary, objects that may be moving steadily, and objects that may be moving erratically, e.g., windblown shrubs or trees. In an embodiment, used to predict object collision in a complex environment, it is desirable to isolate and track objects to discern their potential concern to vehicle 220. Thus, in some embodiments system 400 estimates a scene model comprising the host vehicle state (e.g., 220), as well as the state of objects of potential concern within the FOV of depth imaging system 300 (300').

Scene modeling of the state of vehicle 220 may be made using internal kinematic sensor readouts available from control and other systems or sensors associated with vehicle 220, e.g., speedometer data, accelerometer data, etc. By contrast, the state of objects of potential concern within the FOV can be estimated from range sensor measurements. As used herein in describing such embodiments, execution of software 320 defines a general purpose object state model comprising three-dimensional object size (e.g., a three-dimensional bounding region), three-dimensional position, and two-dimensional velocity and acceleration data, which data preferably are constrained to a planar road model. When used in conjunction with the host vehicle state, this multi-dimensional state vector provides prediction to collisions with obstacles in the imaged scene.

Embodiments of the present invention estimate complete multi-dimensional object state vectors as a two-step process, preferably implemented by execution of software 320. In one step, at each frame of data acquired by system 300 (300'), the segmented range map of off-ground objects is parsed into a set of distinct but unlabeled observation vectors comprising the three-dimensional and position. In a second step, a preferably Kalman Filter tracking framework is applied to the sequence of observation vectors to provide a least squares recursive estimate of the complete state vector for each object, including second order motion model components.

According to embodiments of the present invention, observation vectors preferably are estimated from the previously segmented range image. A set of (X,Y,Z) points is extracted from the sensor data for each unique object region, and object boundaries are delimited from the upper and lower deciles of the one-dimensional distribution along each coordinate axis. The object boundaries provide the position and size components of the observation vector. In practice, this method is superior to a simple minimum bounding region. Further, the method provides a degree of tolerance to noise and aliasing effects in the acquired range image.

A Kalman Filter provides an efficient framework for recursive least squares state estimates in linear dynamical systems. Successfully implementing this framework utilizes both the specification of a motion model to govern the kinematics of tracked objects, and a mechanism to associate observations with existing tracks. In one embodiment, motion model specification employs a second order motion model to deal with the relatively unconstrained and sometimes erratic motion of vehicles, pedestrian objects, pet objects, etc. Implementing a mechanism for associating observations with existing tracks preferably is carried out with a greedy and mutually exclusive matching approach in which the best matching observation-to-track assignment is determined iteratively until all tracks are paired with observations.

Should no suitable observation be found for a given track, the track preferably will be propagated by the Kalman Filter state prediction until it receives a observation update, or it is terminated for relying too long on a prediction. Preferably the match score is determined by the detection measurement residual (i.e., the difference between the predicted and observed data vector) weighted by the Kalman Filter measurement prediction covariance. Potential matches are limited by a validation gate that places a threshold on this match score.

Finally, in a backing-up application, object interpretation logic associated preferably with software 320 will generate a visual and/or acoustic and/or control signal alarm, when a tracked object outside the immediate path of the vehicle is moving in the direction of a collision.

It is understood that software 320 may implement all or some of the embodiments that have been described, and that a given system 400 need not implement each feature that has been described herein. But implementation of the various embodiments will result in an obstacle detection and tracking system that operates more reliably with substantially fewer false-positive signals. The various embodiments that have been described are intended to better an understanding of the present invention, and not to limit that which is claimed.

Modifications and variations may be made to the disclosed embodiments without departing from the subject and spirit of the invention as defined by the following claims.

What is claimed is:

1. An obstacle detection system to detect objects in the path of a motor vehicle moving on a road surface and identify which of said objects are of potential concern as obstacles, the obstacle detection system comprising:

a depth imaging system that acquires depth data and is attachable to said motor vehicle so as to have a field of view encompassing at least a portion of a desired detection zone in which an object of potential concern to said motor vehicle may be present, said depth imaging system including an emitter of optical energy, at least one detector that detects at least a fraction of the emitted said optical energy reflected by at least one of said objects, and means for determining said depth data from a comparison of the emitted said optical energy and said fraction of said optical energy reflected by at least one of said objects;

means for processing data acquired by said depth imaging system to model said road surface in at least said detection zone so as to define at least one road plane therein;

means for discerning from data processed by said means for processing objects that are of potential concern to said motor vehicle; and means for signaling at least one warning mechanism, coupled to said means for discerning, responsive to identification of an object of potential concern.

2. The obstacle detection system of claim 1, wherein said depth imaging system acquires data most of which represents at least one plane of said road surface.

3. The obstacle detection system of claim 1, wherein said means for processing data samples said data.

4. The obstacle detection system of claim 1, wherein said means for processing data carries out a RANSAC routine.

5. The obstacle detection system of claim 1, wherein said depth imaging system is a time-of-flight (TOF) system.

6. The obstacle detection system of claim 1, wherein said depth imaging system includes a stereographic camera system.

7. The obstacle detection system of claim 1, wherein at least one of said means for processing data and said means for discerning includes at least one software routine stored on a machine readable medium, which routine when executed by a processor so processes said data acquired by said depth imaging system.

8. The obstacle detection system of claim 1, wherein said means for discerning employs height detection masking such that an object having height greater than a threshold normal relative to said road plane is identified as being of potential concern.

9. The obstacle detection system of claim 1, wherein said means for discerning includes slope detection masking.

10. A method to detect objects in the path of a motor vehicle moving on a road surface and to identify which of said objects are of potential concern as obstacles, the method comprising the following steps:
- (a) providing a depth imaging system that acquires depth data and is attachable, to said motor vehicle and has a field of view encompassing at least a portion of a desired detection zone in which an object of potential concern to said motor vehicle may be present, said depth imaging system including an emitter of optical energy, at least one detector that detects at least a fraction of the emitted said optical energy reflected by at least one of said objects, and means for determining said depth data from a comparison of the emitted said optical energy and said fraction of said optical energy reflected by at least one of said objects;
- (b) processing data acquired at step (a) to model said road surface in at least said detection zone so as to define at least one road plane therein;
- (c) discerning from data processed at step (b) objects that are of potential concern to said motor vehicle; and
- (d) outputting to at least one warning mechanism at least one signal responsive to identification of an object discerned at step (c) as being of potential concern.

11. The method of claim 10, wherein said depth imaging system acquires data most of which represents at least one plane of said road surface.

12. The method of claim 10, wherein step (b) includes sampling said data.

13. The method of claim 10, wherein step (b) includes processing data using a RANSAC routine.

14. The method of claim 10, wherein said depth imaging system is a time-of-flight (TOF) system.

15. The method of claim 10, wherein said depth imaging system includes a stereographic camera system.

16. The method of claim 10, wherein at least a portion of step (b) is implemented using at least one software routine stored on a machine readable medium, which routine when executed by a processor so processes said data acquired by said depth imaging system.

17. The method of claim 10, wherein step (c) employs height detection masking such that an object having height greater than a threshold normal relative to said road plane is identified as being of potential concern.

18. A method to reduce occurrence of false-positive in detection of objects in the path of a motor vehicle moving on a road surface and to identify which of said objects are of potential concern as obstacles, the method comprising the following steps:
- (a) providing said motor vehicle with a time-of-flight (TOF) imaging system that acquires depth data and has a field of view encompassing at least a plane of said road surface representing a portion of a desired detection zone in which an object of potential concern to said motor vehicle may be present such that depth data acquired includes a plane of said road surface, said TOF imaging system including an emitter of optical energy, at least one detector that detects at least a fraction of the emitted said optical energy reflected by at least one of said objects, and means for determining said depth data from a comparison of the emitted said optical energy and said fraction of said optical energy reflected by at least one of said objects;
- (b) processing data acquired at step (a) to model said road surface in at least said detection zone so as to define at least one road plane therein;
- (c) discerning from data processed at step (b) objects that are of potential concern to said motor vehicle and;
- (d) outputting at least one warning signal responsive to identification of an object discerned at step (c) as being of potential concern.

19. The method of claim 18, wherein step (c) includes at least one of (i) height detection masking such that an object having height greater than a threshold normal relative to said road plane is identified as being of potential concern, and (ii) slope detection masking.

20. The method of claim 18, wherein step (b) includes processing data using a RANSAC routine.

* * * * *